May 29, 1923.
M. F. KANE
1,456,736
ILLUMINATED LICENSE TAG HOLDER FOR VEHICLES
Filed April 28, 1922
2 Sheets-Sheet 1
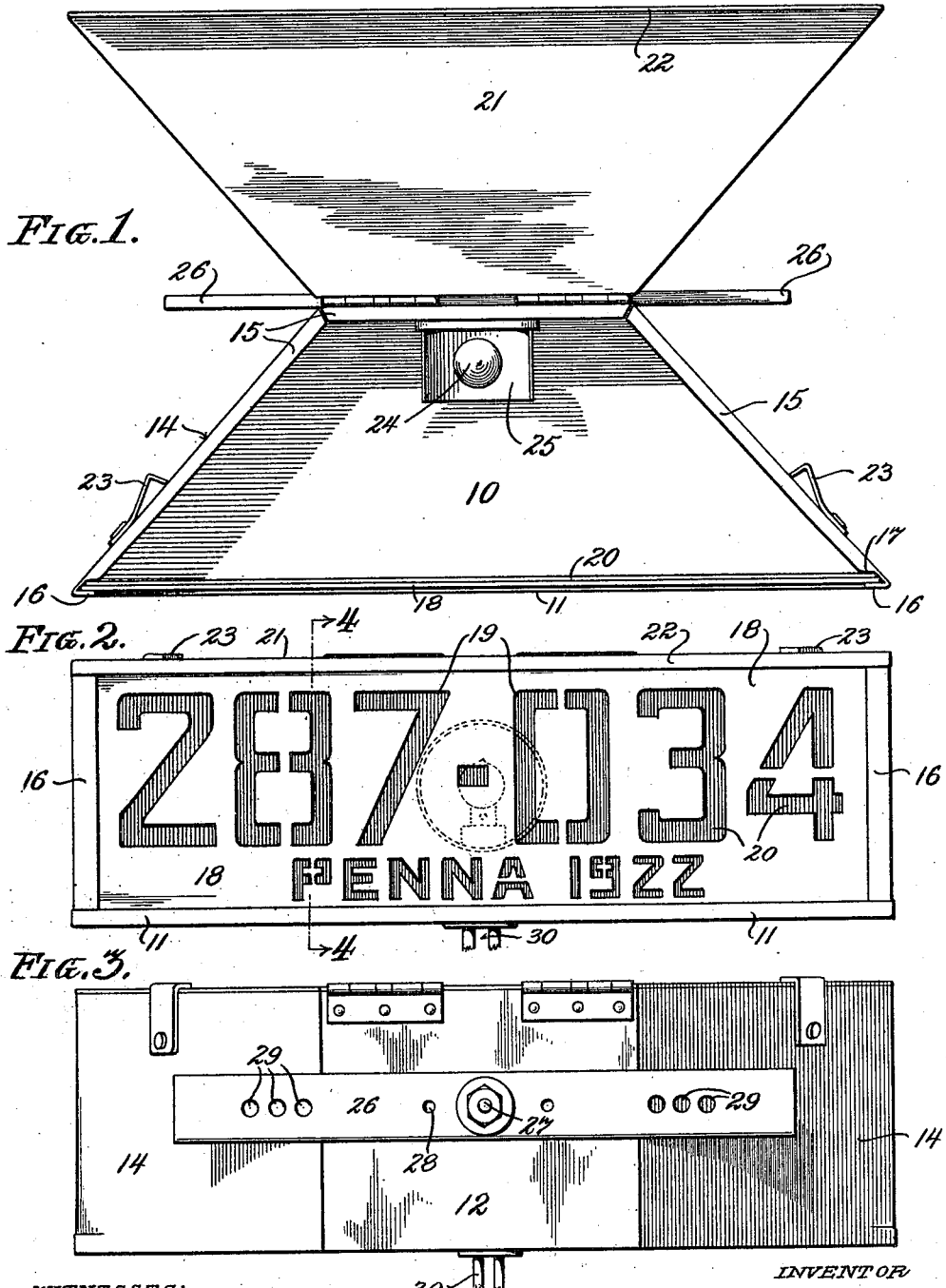
INVENTOR
Michael F. Kane
BY Joshua R. H. Potts,
HIS ATTORNEY
WITNESSES:

May 29, 1923.
M. F. KANE
ILLUMINATED LICENSE TAG HOLDER FOR VEHICLES
Filed April 28, 1922   2 Sheets-Sheet 2
1,456,736
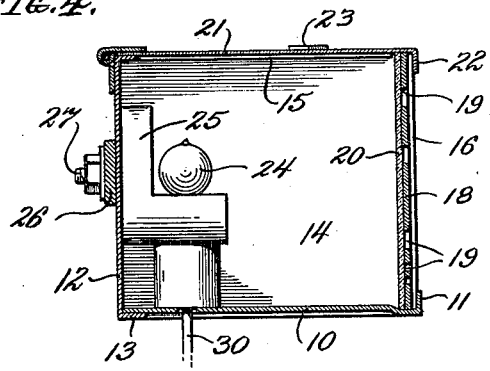
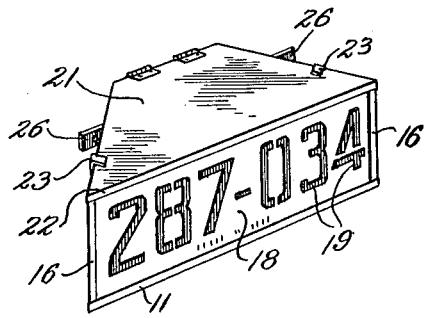
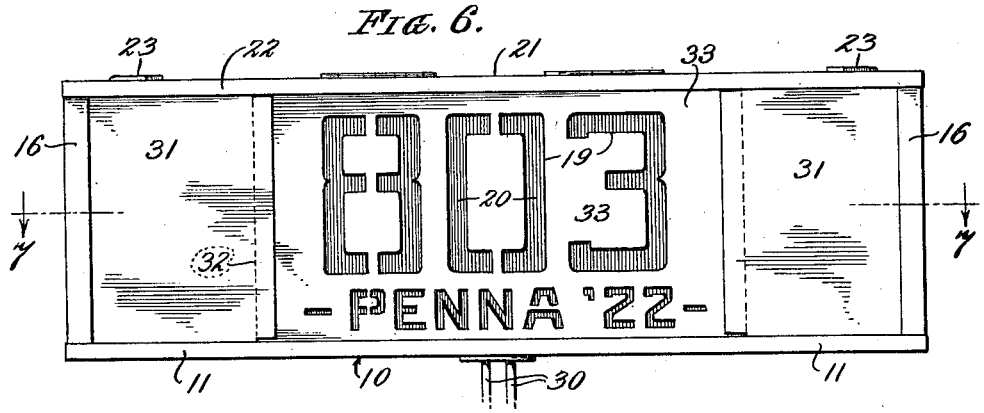
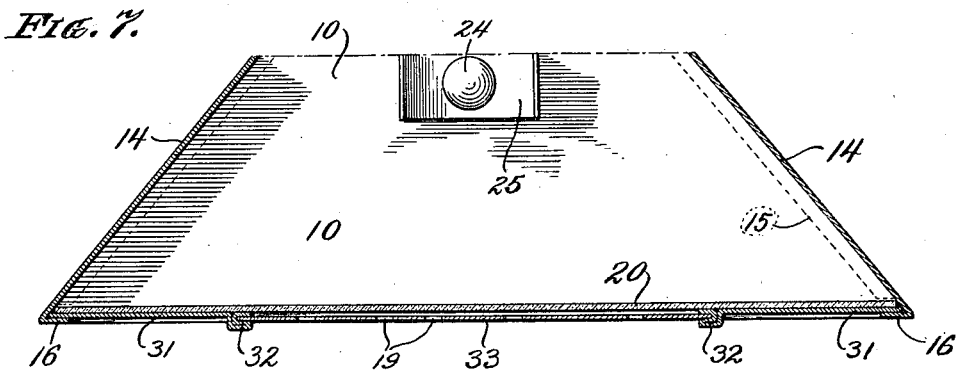
INVENTOR
Michael F. Kane
BY Joshua R. H. Potts,
HIS ATTORNEY
WITNESSES:

Patented May 29, 1923.

1,456,736

UNITED STATES PATENT OFFICE.

MICHAEL F. KANE, OF SHAFT, PENNSYLVANIA.

ILLUMINATED-LICENSE-TAG HOLDER FOR VEHICLES.

Application filed April 28, 1922. Serial No. 557,170.

*To all whom it may concern:*

Be it known that I, MICHAEL F. KANE, a citizen of the United States, residing at Shaft, in the county of Schuylkill and State of Pennsylvania, have invented certain new and useful Improvements in Illuminated-License-Tag Holders for Vehicles, of which the following is a specification.

This invention relates to improvements in illuminated license tag holders for vehicles, especially automobiles, and an object thereof is to provide a novel device of this character whereby the license number and other appropriate data appearing on the tag may be rendered readily visible in the night time as well as in the day time.

Another object of the invention is to provide a device of the character referred to which is embodied in a housing or hood of novel construction having means for supporting the same upon the automobile or other vehicle, and which is provided to accommodate or removably support a license tag in position to be illuminated by the light rays emanating from the light source within the hood, the receiving means for the tag being also adapted to receive a suitable colored panel and provision being made to accommodate license tags of different sizes.

These objects, and other advantageous ends which will be described hereinafter, I attain in the following manner, reference being had to the accompanying drawings in which—

Figure 1 is a plan view of the improved illuminated license tag holder with the lid in an open position, Figure 2 is a front elevation of the device with the lid closed, Figure 3 is a rear elevation of the device, Figure 4 is a vertical sectional view taken on the line 4—4 of Figure 2, Figure 5 is a perspective view of the device on a reduced scale, Figure 6 is a front elevation showing a modification, and Figure 7 is a horizontal sectional view taken on the line 7—7 of Figure 6.

Referring to the form of the invention shown in Figures 1 to 5 inclusive, the device comprises a hood or box having a bottom 10 provided with an up-standing flange 11 at the front edge thereof and a back wall 12 joined to the back edge thereof as by the underlying flange 13. The back wall 12 is bent intermediately at two points to form forwardly diverging side walls 14 which together with the back wall are provided with inturned forwardly extending top flanges 15, while the forward ends of the side walls 14 are provided with inwardly extending vertical side flanges 16 extending in opposite directions toward each other.

The two top flanges 15 of the side walls 14 are discontinued or terminate in spaced relation to the flanges 16, the sheet metal from which the box is bent into form, being cut-out as indicated at 17 to allow the license tag 18 to be inserted from the top and disposed in rear of the flanges 11 and 16. The license tag is perforated to form the characters giving the number, State and year, or other suitable data as indicated at 19 and a colored transparent or translucent plate or panel 20 is slid down in rear of the tag 18 through the cut-out portions 17, the tag and plate being retained in position by the flanges 11 and 16 co-acting with the bottom 10, sides 14 and forward ends of the top flanges 15 of said sides. A lid 21 is also hinged to the back of the hood and shaped similarly to the bottom so that the box or hood enlarges or flares forwardly toward the open side in which the license tag is mounted. The lid is adapted to overlie the flanges 15 and has a drop flange 22 at the front edge thereof so as to overlie the flanges 16 and the license tag so as to prevent the entrance of rain or snow into the hood when the lid is closed. The lid may be held in a closed position as by means of clips 23 or other suitable retaining means carried by the sides in position to engage the lid when the latter is swung to cover the open top of the box, so as to prevent accidental swinging movement of the lid. It will also be noted that the forward edges of the flanges 15 at the cut-outs 17 serve as abutting means for the rear of the license tag 18 or the panel 20 in conjunction with the rearwardly converging sides producing the tapered box construction.

The interior of the box may be colored or so arranged as to produce a reflector surface and the tag is illuminated through the medium of a suitable light source shown in the form of an electric lamp 24 mounted at the rear of the box and having a reflector 25 projecting the rays forwardly toward the tag. This reflector in conjunction with a bar 26 arranged horizontally across the back so as to project from the ends thereof, is supported in position by common fastening means, such as a bolt 27 extending through an aperture in the back 12. The bar 26 is provided with a plurality of apertures 28 permitting adjustment or additional connection, and a plurality of apertures 29 adjacent each end for proper attachment or adjustment in connection with the usual or any preferred supporting means arranged at the rear of the body of the automobile or other vehicle.

In use, the conductor wires 30 are lead through to the bottom of the hood or box for supplying current to the lamp 24 and the rays from the lamp are projected and reflected onto the license tag so as to shine through the perforations forming the characters to be rendered visible, as well as through the panel which is disposed in back of the same. When used at the rear of a vehicle, the panel is preferably made of a red color so that red light will shine through the numbers and letters of the license tag to render them readily visible, and also to serve as a red tail light. When used on the front of the vehicle, the panel can be made of a clear or frosted light colored glass or the like, and in either instance, the characters of the tag will be clearly visible in the day time as well as at the night time.

In the form of the device shown in Figures 6 and 7, the construction is the same as heretofore described, except that in order to accommodate shorter license tags, so that different sized tags may be accommodated in the same hood, filler plates or filling pieces 31 are provided. These plates are opaque and engage in the guideways or grooves provided at the sides for receiving the ends of the license tag and panel as heretofore described. In addition, these filler plates are provided with grooves 32 at their inner ends accommodating, for vertical sliding movement therein, the ends of the license tag 33 which is much shorter than the license tag 18, this somewhat depending upon the number of characters employed and the variations in the sizes of the plates as employed in the different States. Of course, it is to be understood that the filler plates 31 may be made of lengths to correspond and properly accommodate the license tag.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A tag holder for vehicles comprising a housing having an opening, and flanges at the bottom and sides of said opening, there being other flanges on the side walls of said housing disposed at an angle to the side flanges, and having cut outs adjacent to the side flanges; a tag removably disposed in the guides formed by said flanges; and a lid for the housing for holding the tag against displacement.

2. A tag holder for vehicles comprising a housing having forwardly diverging sides forming an opening provided with bottom and side flanges; a tag and associated parts disposed in the guide-ways formed by the diverging sides and said flanges; and a hinged top for said housing having a flange overlying said tag.

3. A tag holder for vehicles comprising a housing having forwardly diverging sides forming an opening provided with bottom and side flanges; a tag and associated parts disposed in the guide-ways formed by the diverging sides and said flanges; a hinged top for said housing having a flange overlying said tag; and a source of light disposed in the rear end of said housing.

4. An illuminated license tag holder for vehicles comprising a hood having an opening and flanges at the bottom and sides of said opening, there being other flanges on the side walls of said hood and disposed at an angle to the side flanges, said other flanges being provided with cut-outs adjacent to the side flanges, and adapted to removably receive a license tag behind the first mentioned flanges; a lamp within the hood, and a lid for the hood and having a flange overlying the tag.

5. An illuminated license tag holder for vehicles comprising a hood having forwardly diverging sides forming an open front portion with a bottom flange and side flanges, the top of the hood being open there being other flanges on the side walls of said hood and disposed at an angle to the side flanges, said other flanges having cut-outs adjacent the upper ends of said side flanges; a hinged lid carried by the back of the hood, and a lamp mounted in the hood, said cut-outs forming guideways with the first mentioned flanges and sides of the hood for receiving a panel and license tag.

6. An illuminated license tag holder for vehicles comprising a hood having forwardly diverging sides forming an open front portion with a bottom flange and side flanges, the top of the hood being open there being other flanges on the side walls of said hood and disposed at an angle to the side flanges, said other flanges having cut-outs adjacent the upper ends of said side flanges; a hinged lid carried by the back of the hood;

filler plates engaged in the cut-outs between the flanges and sides of the hood and having grooves at their inner ends adapted to receive the ends of a perforate license tag; a panel behind the tag and plates, and a lamp mounted within the hood at the back thereof.

7. An illuminated license tag holder for vehicles comprising a hood having a bottom portion with an up-standing flange at the front edge thereof and a back extending up from the rear edge with sides diverging from the ends of the back and having top flanges and front end flanges extending inwardly adjacent the up-standing flange of the bottom; a lid hinged to the back and shaped to overlie the flanges of the sides and close the top of the hood, said lid having a downturned front flange, the top flanges of the sides terminating in spaced relation to the end flanges of the sides providing cut-outs; a panel slidably engaged in said cut-outs and a perforate license tag disposed in front of the same; said hood having guideways to receive the vertical edges of the tag with the flange of the lid overlying the panel and tag and setting upon the top flanges of the sides, and a lamp in the hood.

In testimony whereof I have signed my name to this specification in the presence of two subscribing witnesses.

MICHAEL F. KANE.

Witnesses:
W. H. JONES,
AUGUST G. HESS.